United States Patent [19]

Morawetz et al.

[11] 4,044,949

[45] Aug. 30, 1977

[54] HEAT STORAGE SYSTEM

[76] Inventors: Ernst Morawetz, Repslagarevagen 10, Staffanstorp, Sweden, S-24500; Lars-Olof Glas, Fabriksvagen 1, Vasterhaninge, Sweden, S-13700

[21] Appl. No.: 658,557

[22] Filed: Feb. 26, 1976

[51] Int. Cl.[2] .............................. F24J 3/02; F24D 3/00
[52] U.S. Cl. .................................. 237/1 A; 126/271; 126/400; 237/8 R; 219/279
[58] Field of Search ............... 237/1 A, 8 R; 126/271, 126/400; 219/279, 282

[56] References Cited

U.S. PATENT DOCUMENTS

| 1,122,989 | 12/1914 | Newkumet | 219/279 |
|---|---|---|---|
| 1,888,620 | 11/1932 | Clark | 237/8 R |
| 2,553,302 | 5/1951 | Cornwall | 126/271 |
| 2,888,204 | 5/1959 | Williams | 237/8 R |
| 3,107,052 | 10/1963 | Garrison | 126/271 |
| 3,931,806 | 1/1976 | Hayes | 126/271 |
| 3,958,755 | 5/1976 | Cleer, Jr. | 126/271 |
| 3,977,601 | 8/1976 | Bearzi | 126/271 |

Primary Examiner—John J. Camby
Assistant Examiner—Henry C. Yuen
Attorney, Agent, or Firm—Jones, Tullar & Cooper

[57] ABSTRACT

The invention pertains to an automatic heat storage system comprising two cooperating sources of heat, two heat storage vessels, and a heat emitting system, the heat being transferred by a heating medium common for the entire system. Preferably, one of the sources of heat is a solar energy collector system.

8 Claims, 2 Drawing Figures

HEAT STORAGE SYSTEM

The present invention primarily concerns an automatic heating system intended for dwellings or the like, in which system the radiation from the sun as well as electric sources of heat are used.

Electrical heat storage systems are previously known and are used to a limited extent nowadays. Usually, these systems use water as a storage medium in a vessel which works as an electric central heater, but also as a storage vessel. The vessel consists of a well insulated sheet container. The water contained in the vessel is heated by means of electrical heating elements, preferably at night, provided that cheap current is available. Good economy is also obtained by the fact that the water at the top of the vessel has a high temperature which is due to stratification. This means that the discharge temperature to a heat emitting system, e.g., a set of radiators, does not decrease appreciably and that the adjustability of the system will be excellent.

The development of systems for accumulation of different forms of energy is a comparatively new technological branch. More expensive energy, which is a consequence of the exhaustion of fossil fuels has given rise to an intensive study of new forms of energy which up to now have been utilized to a small extent, e.g., solar, wind, wave and geothermic energy, and the possibility of storing them for later use.

It is previously known to use solar energy, e.g., for heating of dwellings during this winter season, e.g., in Sweden, but conventional energy must be used to supplement such an energy supply.

Experiments of using solar energy in an economic manner as a supplement to the required energy supply in order to obtain a satisfactory heating of dwellings have not been successful up to now. There have been difficulties when trying to make the substantially conventional heating system and the solar energy system cooperate in a reliable and in an optimal and economic manner.

The object of the present invention is to combine the heat energy of a conventional heating system, preferably an electrical heating system, with the heat energy of a heating system, wherein the heat energy is generated by solar or wind energy transforming devices or the like, in such a manner that the heat supply can easily be adjusted automatically or manually and be adapted to the heat requirements. This should include the use of temperature regulators or the like known per se.

According to the present invention a conventional heat storage system is combined with a solar or wind energy system or the like having a heating medium but having intermittent delivery of heat energy for reliable cooperation in a balanced manner under every kind of weather condition and heat requirement.

The heating system according to the invention is an automatic, integrated heat storage system of heating medium and including a first non-conventional source of heat and a second conventional source of heat and means for the distribution and storing of the common heat medium in the system. The system includes at least two storage vessels and at least two pumps for displacing the heating medium, means for compensating the thermal expansion of the heating medium in the closed system, means for draining the heating medium from the first source of heat when there is a risk of freezing or overheating and means for improving the operational reliability during said drainage.

The first pump displaces the heating medium through the first source of heat when said source produces enough heat energy, which is automatically monitored. Otherwise said pump will be stopped. The heating medium flows from said first source of heat into a heat emitting system. The second pump displaces the heating medium through the heat emitting system. After passing through said heat emitting system, e.g., via a set of radiators, the heat medium can be by-passed to the inlet of said heat emitting system or can be displaced by said first pump through said first source of heat for continued heat absorption.

Said first source of heat can generate relatively great amounts of heat energy intermittently. Collectors for solar energy can develop more heat energy on sunny days than the heat emitting system can be allowed to emit. The residual heat energy will be charged into the upper part of the first storage vessel by charging the heating medium, heated by the solar energy at the upper part of the vessel and simultaneously discharging a corresponding amount of heating medium at the bottom of the vessel, having a lower temperature, and to displace this amount through the first source of heat by the first pump. Hot heating medium can then automatically be discharged from the upper part of the vessel when an increased heat energy supply is required for the heat emitting system. When there is a risk of overheating and boiling of the heating medium at intense sunshine, the first pump will be stopped and the first source of heat will be drained.

According to a preferred embodiment of the present invention said conventional second source of heat is arranged in a second storage vessel. The temperature of the heating medium at the upper part of the vessel can always be adjusted to a desired level by means of this conventional source of heat. Hot heating medium is discharged from the upper part of said vessel in dependence of the requirements of heat energy supply to the heat emitting system together with the heating medium from the first source of heat and/or together with the heating medium from the upper part of the first vessel. At the same time cooled heat medium flows into the bottom of the second vessel in an amount corresponding to the amount which is supplied from the upper part of said vessel. This cooled heat medium is delivered from the outlet of the heat emitting system. The second pump operates constantly and displaces heating medium through the heat emitting system, also when there is no emission of heat energy in said system and independent of the operation conditions of the first pump.

The amount of heating medium flowing from the first source of heat and to or from the upper part of the first vessel are monitored automatically by means of a temperature regulator. This also applies to the amount of heating medium from the upper part of the second vessel.

Furthermore, the storage vessels contain a certain volume of gas above the surface of the heating medium. This compressible gas is used for compensating the thermal expansion of the heating medium in the closed system. It also facilitates the drainage of the first source of heat, e.g., sun collectors, when there are risks of freezing and overheating and prevents losses in heat energy when the first pump is stopped. The gas should be inert, e.g., nitrogen, to avoid corrosion in the system.

If the temperature of the first source of heat falls below the temperature of the heating medium passing through the first pump, or if the outdoor temperature falls below a certain minimum temperature, e.g., +5° C, or the temperature of the first source of heat exceeds a certain maximum temperature, e.g., +95° C when the heating medium is water, the first pump is stopped and the heating medium of the first source of heat is drained and replaced by the gas contained in the vessels. Thereby cooling, freezing and overheating, respectively, of the heating medium are avoided.

However, when the first pump is started the mixture of gas and heating medium can easily be transferred to the heat emitting system, where the gas forms gas pockets which cause bad heat exchange.

To avoid the disadvantage that the gas is transferred to the heat exchange system, a gas separation tube is interposed in a first pipe between the first source of heat and the two storage vessels. The gas separation tube communicates with the storage vessels, i.e., the fluid levels in the three vessels are substantially identical. The gas separation tube is preferably a vertically extending tube having a large diameter. Said first pipe leads to the upper part of the gas separation tube. Through a second pipe the heating medium can flow from the bottom part of the gas separation tube to the storage vessels. Through a third pipe from the upper part of the gas separation tube the gas can flow from the vessels at the draining of the first source of heat and back to the vessels at the starting of the first pump.

At the drainage of the first heat source the heating medium is passed back through said first pump. Thereby, the gas contained in the upper part of the vessels can rise in said first pipe and charge the first heat source.

When the first pump is restarted, the gas is displaced from the first source of heat and the mixture of gas and heat medium is advanced through said first pipe to the upper part of the gas separation tube. Since the diameter of said tube is considerably larger than the diameter of said first pipe, the gas will be separated from the mixture and is pressed back to the storage vessels through said third pipe.

The second storage vessel is preferably supplied with one or several electric heaters of a previously known kind, which are preferably provided at the upper part of the vessel. This is the main energy source of the heating system and must be dimensioned accordingly.

The first storage vessel can also be provided with electric heaters. When the weather is cold and much heat is required this vessel operates in the same way as the second storage vessel and in parallel therewith. The heating medium contained in both vessels is then displaced by means of the second pump only to the heat emitting system (radiators, floor heat exchangers, or the like).

The invention will now be described with reference to the accompanying drawing, which shows only one preferred embodiment out of several.

Figure 1:
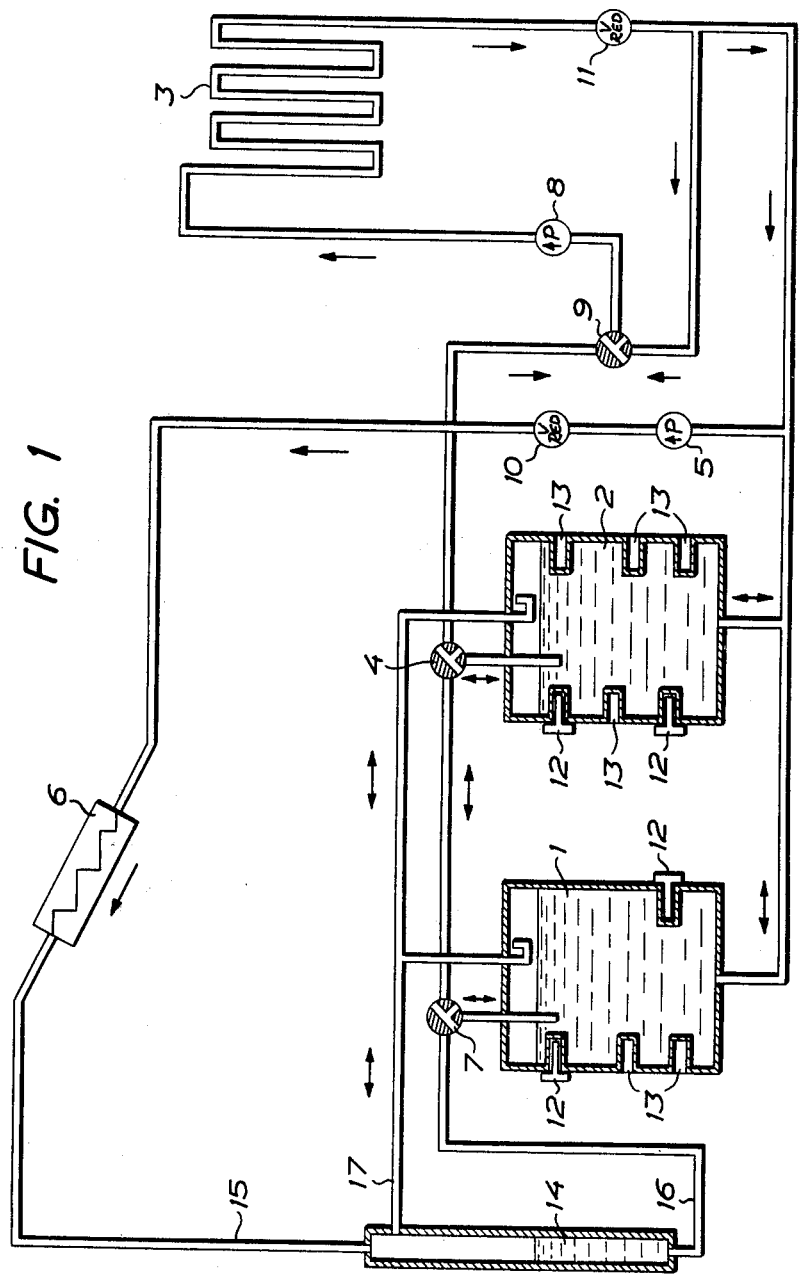
FIG. 1 shows in a simplified and schematic manner an essentially automatically operated heating system with solar energy and electric energy sources intended for a dwelling-house, whereby drainable solar collectors are used.

The storage vessel 1 is normally used for storing solar energy and has a temperature between +30° C and +60° C. The storage vessel 2 is normally used for storing electric energy and has a temperature between +30° C and +90° C. During extremely cold weather with small amounts of solar energy both the vessel 1 and the vessel 2 must operate with electric heating up to a temperature of +90° C in order to guarantee the required heat supply to the house.

During the summer season both vessels 1 and 2 should operate with storing of solar energy also for the hot tap water which is heated by means of heat exchange. The supply of solar heated and/or electric heated water to the radiators 3 of the heating exchange system is then shut off. However, cold or cool water can flow from the bottom of the vessel 1 and/or 2 to the pump 5 to be displaced to the solar collectors 6 for heating with this flow being regulated by solenoid valves 4 and 7.

The pump 5 circulates water from the vessel 1 through the solar collectors 6 as soon as the solar energy provides a higher temperature $t_s$ at the outlet of the solar collectors compared with the temperature $t_1$ at the water outlet from the bottom of vessel 1. If $t_s$ is lower than $t_1$, the solenoid valve 7 closes so that the water of the vessel 1 cannot be transferred to and be cooled by the solar collectors 6. If $t_s$ is lower than $t_5$, which is the temperature at the pump 5, the pump 5 will stop and the solenoid valve 7 will open to make it possible to discharge water from the upper part of the vessel 1. If $t_s$ is lower than, e.g., +5° C or higher than +95° C the pump 5 is stopped. At said stop the water of the solar collectors 6 and the return pipe 15 is drained essentially by by-passing the pump 5. Some of the gas contained in the vessels 1 and 2, which may be nitrogen, can flow through the third pipe 17 to the gas separation tube 14 and further through the return pipe 15 to charge the solar collectors 6 and prevent the heating medium from being cooled, frozen or overheated. When the solar collectors 6 have again an acceptable temperature, the pump 5 is started and displaces a solar heated gas and water mixture through the solar collectors 6 and the return pipe 15 to the gas separation tube 14. In this tube, the gas is separated from the hot water so that the essentially gas-free water can flow through the pipe 16 to the storage vessels 1 and 2 and to the heat exchanger system 3.

The pump 8 circulates heated water through the heating system 3, and displaces hot water from the heat storage vessels 1 and 2 and, if the pump 5 is operating, from the solar collectors 6, but also recirculated water from the heating system 3 upon activation of solenoid valve 9.

If the output capacity of the pump 8 ($m_8$), is greater than the capacity of the pump 5 ($m_5$), the pump 8 is able to draw hot water from the vessel 1 also when the pump 5 is working. However, if $m_5$ is greater than $m_8$ this is not possible.

The throttle valves 10 and 11 are necessary to set the proper output capacity $m_5$ and $m_8$ for the pumps 5 and 8, respectively. The valve 10 can have two different adjustment positions, one for the winter season and one for the summer season, due to the heating of hot tap water during the summer season. During the summer season $m_5$ should be at about half the value of the winter season.

Additional valves (not shown in the Figure) are necessary to guide and control the water of the system for achieving optimal capacity and economy.

Electric heaters 12 heating the water of the vessels 1 and 2 are operated by means of one or more temperature regulators (not shown) in and outside each vessel and by timers (not shown) set to be switched on preferably during the night. The electric heaters 12 are also manually operated independently of the impulses from the temperature regulators and the timers. The electric heaters 12 of the vessel 1 are normally not to be used and the heaters of the vessel 2 are usually disconnected during the summer season. Pockets 13 for the sensing means (not shown) of the temperature regulators are arranged at several levels between the bottom and the top of the vessels to permit their most suitable level to be tried out. The temperature setting level may be selected between +30° C and +90° C.

When the sun collectors 6 are drained, they are charged with gas. This gas has a certain overpressure equal to the pressure of the vessels 1 and 2. However, in the sun collectors small leakages easily occur through which heat medium cannot leak out, but where the gas can leak out and thus diminish the positive pressure of the heating system. Such leakage problems can also occur in the vicinity of the vessels 1 and 2.

Figure 2:
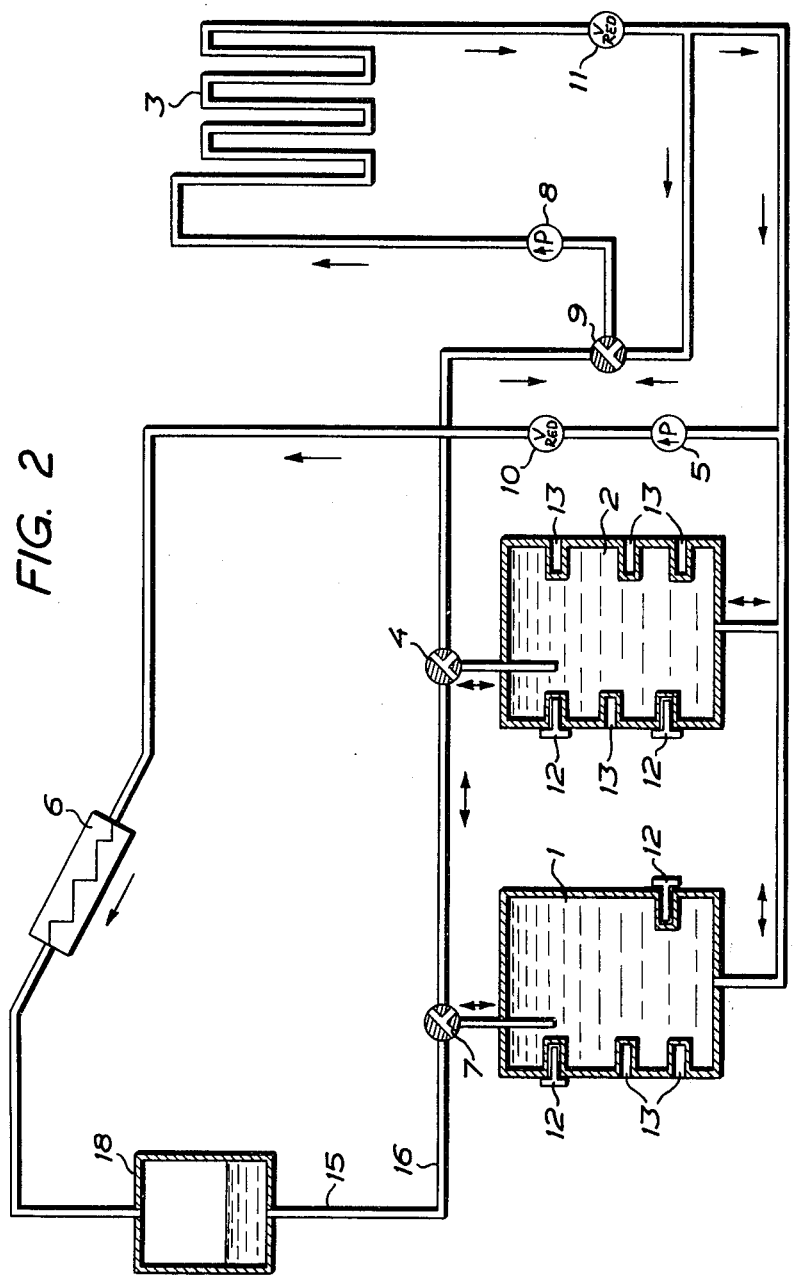
FIG. 2 shows a second embodiment of the invention.

This disadvantage is overcome in the second embodiment of the invention, shown in FIG. 2, by enclosing the inert gas, e.g., nitrogen, in a separate gas container 18, which is interposed in the first pipe 15 at a suitable height. The container 18 contains heating medium, the volume of which must not fall below a predetermined value, and a gas encased above the surface of the heating medium. The position of the gas container 18 is selected in such a way that when the sun collectors system 6 is drained, the system and the supply and discharge pipes which are exposed to said risks of freezing and overheating are charged with gas. In this embodiment the gas can be kept at a pressure which does not essentially differ from the atmospheric pressure. Thereby, the risks of gas leakages are reduced.

In this second embodiment, the gas separation tube 14 is superfluous and both the vessels 1 and 2 are filled up with the heating medium.

It is also possible to provide a by-pass pipe by-passing the gas container 18. The by-pass pipe can be connected by means of a valve when the conditions are stable. The heating system must still be connected to the bottom of the gas container, which implies that the gas container operates as a gas spring when there is thermal expansion in the heating system.

Again, with reference to the drawings, the invention can be described in the following manner:

The drawings describe an automatic heat storage system containing circulating fluid heating medium comprising, means for collecting solar heat energy 6 having a heating medium inlet and outlet; a first heat storage vessel 1 having openings for heating medium inlet or outlet at the top and bottom thereof, the top opening being connected to a first valve means 7; a second heat storage vessel 2, operably associated with auxiliary heating means 12 for heating medium therein, having openings for heating medium inlet or outlet at the top and bottom thereof, the top opening being connected to a second valve means 4, a heat emitting system 3 having a heating medium inlet and outlet; a first pump 5 for circulating heating medium through said solar heat energy collecting means 6; a second pump 8 for circulating heating medium through said heat emitting system 3; a first pipe 15, 16 connecting the outlet of the solar heat energy collecting means 6 with said first valve means 7; a second pipe connecting said first valve means 7 with said second valve means 4, a third pipe connecting said second valve means 4 with the inlet of said heat emitting system 3, through said second pump 8; a fourth pipe connecting at one end thereof to the outlet of said heat emitting system 3 and at the other end thereof to said first pump 5; a fifth pipe connecting said first pump 5 with the inlet of said solar heat energy collecting means 6; a sixth pipe connecting with said fourth pipe and the bottom openings of both said first heat storage vessel 1 and said second heat storage vessel 2; said pumps 5 and 8 and first and second valve means 7 and 4 being adapted to control the flow of the heating medium in the following alternate paths:

i. passing the heating medium from said solar heat collecting means 6 through the first pipe 15 and 16 and partially through the first valve means 7, the second valve means 4, the third pipe and second pump 8, and the heat emitting system and returning heating medium through the fourth pipe, said first pump 5 and the fifth pipe to said solar heat energy collecting means 6, and partially through the first and second valve means 7 and 4 into the top of both said first and second heat storage vessels 1 and 2, while withdrawing heating medium from the bottom of said first and second heat storage vessels 1 and 2 through the sixth and fourth pipes, said first pump 5 and the fifth pipe to said solar heat energy collecting means 6, ii. passing the heating medium from said solar heat energy collecting means 6 through the first pipe, and partially through the first valve means 7, the second pipe, the second valve means 4, and the third pipe and second pump 8, through the heat emitting system 3 and returning heating medium through the fourth pipe, said first pump 5 and the fifth pipe to said solar heat energy collecting means; and partially into the top of said first heat storage vessel through said first valve means 7; while withdrawing heating medium from the bottom of said first heat storage vessel 1 through the sixth pipe and passing it through the fourth pipe, said first pump 5 and the sixth pipe to said solar heat energy collecting means 6, iii. passing heating medium from the top of said first heat storage vessel 1 through said first valve means 7, the second pipe, the second valve means 4, and the third pipe and second pump 8, through said heat emitting system 3 and returning heating medium through the fourth pipe and sixth pipe to the bottom of said first heat storage vessel 1, iv. passing heating medium from the top of said second heat storage vessel 2 through said second valve means 4 and the third pipe and second pump 8, through said heat emitting system 3 and returning heat medium through the fourth and sixth pipe to the bottom of said second heat storage vessel 2, v. passing the heating medium from the top of said second heat storage vessel 2 through said second valve means 4 partially through the second pipe and said first valve means 7 into the top of said first heat storage vessel 1 and partially through said third pipe and second pump 8, through said heat emitting system 3, while returning heating medium from the bottom of said first heat storage vessel 1 into the bottom of said second heat storage vessel 2 through the sixth pipe, and from said heating emitting system 3 through the fourth and sixth pipes into the bottom of said second heat storage vessel 2, vi. passing the heating medium from said solar heat energy collecting means through the first pipe, said first valve means 7, the second pipe, said second valve means 4, and the third pipe and second pump 8, through said heat emitting means 3 and returning it to said solar heat energy collecting means through the fourth pipe, said first pump 5 and said fifth pipe.

Preferably, the heat storage system has means to drain the heating medium from said solar heat energy collecting means 6 when the outdoor temperature falls below a predetermined minimum temperature or when the temperature of the heating medium at the outlet of said solar heat energy collecting means exceeds a predetermined maximum temperature.

Further, in one embodiment, the heat storage system has a gas separation tube comprising a vertically arranged container 14, having a diameter larger than the diameter of said first pipe, interposed between sections 15 and 16 of said first pipe, together with a seventh pipe 17 connecting the top of said gas separation tube 14 to the tops of said first and second heat storage vessels 1 and 2, to permit gas flow between said tube 14 and said vessels 1 and 2, thereby enabling separation of gas from the heating medium and preventing the transfer of gas together with the heating medium into the heat emitting system.

Preferably, the heat storage system has control means to prevent flow of the heating medium from said solar heat energy collecting means 6 into said first heat storage vessel 1 when the temperature of the heating medium flowing from the bottom of said first heat storage vessel 1 exceeds the temperature of the heating medium flowing from said solar heat energy collecting means 6.

In an alternative embodiment, FIG. 2, the heat storage system has a gas container 18 interposed in the first pipe, for containing a gas encased above the surface of a predetermined minimum volume of heating medium.

In a preferred embodiment, the heat storage system has an eighth pipe connecting the fourth pipe and the third pipe, together with a third valve means 9 associated with said eighth pipe to permit partial recycling of heating medium flowing through said heat emitting system 3.

What is claimed is:

1. An automatic heat storage system containing circulating fluid heating medium comprising:
   a. means for collecting solar heat energy having a heating medium inlet and outlet,
   b. a first heat storage vessel having openings for heating medium inlet or outlet at the top and bottom thereof, the top opening being connected to a first valve means,
   c. a second heat storage vessel, operably associated with auxiliary heating means for heating medium therein, having openings for heating medium inlet or outlet at the top and bottom thereof, the top opening being connected to a second valve means,
   d. a heat emitting system having a heating medium inlet and outlet,
   e. a first pump for circulating heating medium through said solar heat energy collecting means,
   f. a second pump for circulating heating medium through said heat emitting system,
   g. a first pipe connecting the outlet of the solar heat energy collecting means with said first valve means,
   h. a second pipe connecting said first valve means with said second valve means,
   i. a third pipe connecting said second valve means with the inlet of said heat emitting system through said second pump,
   j. a fourth pipe connecting at one end thereof to the outlet of said heat emitting system and at the other end thereof to said first pump,
   k. a fifth pipe connecting said first pump with the inlet of said solar heat energy collecting means,
   l. a sixth pipe connecting with said fourth pipe and the bottom openings of both said first heat storage vessel and said second heat storage vessel,
   m. said pumps, said pipes and first and second valve means being the means adapted to control the flow of the heating medium in the following alternate paths:
      i. passing the heating medium from said solar heat collecting means through the first pipe and partially through the first valve means, the second valve means, the third pipe and second pump, and the heat emitting system and returning heating medium through the fourth pipe, said first pump and the fifth pipe to said solar heat energy collecting means; and partially through the first and second valve means into the top of both said first and second heat storage vessels, while withdrawing heating medium from the bottom of said first and second heat storage vessels through the sixth and fourth pipes, said first pump and the fifth pipe to said solar heat energy collecting means,
      ii. passing the heating medium from said solar heat energy collecting means through the first pipe, and partially through the first valve means, the second pipe, the second valve means, and the third pipe and second pump, through the heat emitting system and returning heating medium through the fourth pipe, said first pump and the fifth pipe to said solar heat energy collecting means; and partially into the top of said first heat storage vessel through said first valve means; while withdrawing heating medium from the bottom of said first heat storage vessel through the sixth pipe and passing it through the fourth pipe, said first pump and the sixth pipe to said solar heat energy collecting means,
      iii. passing heating medium from the top of said first heat storage vessel through said first valve means, the second pipe, the second valve means, and the third pipe and second pump, through said heat emitting system and returning heating medium through the fourth pipe and sixth pipe to the bottom of said first heat storage vessel,
      iv. passing heating medium from the top of said second heat storage vessel through said second valve means, and the third pipe and second pump, through said heat emitting system and returning heat medium through the fourth and sixth pipe to the bottom of said second heat storage vessel,
      v. passing the heating medium from the top of said second heat storage vessel through said second valve means partially through the second pipe and said first valve means into the top of said first heat storage vessel, and partially through said third pipe and second pump, through said heat emitting system, and returning heating medium from the bottom of said first heat storage vessel into the bottom of said second heat storage vessel through the sixth pipe, and from said heating emitting system through the fourth and sixth pipes into the bottom of said second heat storage vessel, vi. passing the heating medium from said solar heat energy collecting means through the first pipe, said first valve means, the second pipe, said second valve means, and the third pipe and second pump, through said heat emitting means and returning it to said solar heat energy collecting means through the fourth pipe, said first pump and said fifth pipe.

2. The heat storage system, as in claim 1, having means to drain the heating medium from said solar heat energy collecting means when the outdoor temperature falls below a predetermined minimum temperature or when the temperature of the heating medium at the outlet of said heat collecting means exceeds a predetermined maximum temperature.

3. The heat storage system, as in claim 1, having a gas separation tube comprising a vertically arranged container, having a diameter larger than the diameter of said first pipe, interposed between sections of said first pipe.

4. The heat storage system, as in claim 1, having a gas separation tube comprising a vertically arranged container, having a diameter larger than the diameter of said first pipe, interposed between sections of said first pipe, together with a seventh pipe connecting to the top of said gas separation tube to the tops of said first and second heat storage vessels, to permit gas flow between said tube and said vessels, thereby enabling separation of gas from the heating medium and preventing the transfer of gas together with the heating medium into the heat emitting system.

5. The heat storage system, as in claim 1, having control means to prevent flow of the heating medium from said solar heat collecting means into said first heat collecting vessel when the temperature of the heating medium flowing from the bottom of said first heat collecting vessel exceeds the temperature of the heating medium flowing from said heat collecting means.

6. The heat storage system, as in claim 1, wherein said auxiliary source is an electric source of heat.

7. The heat storage system, as in claim 1, having an eighth pipe connecting the fourth pipe and third pipe, together with a third valve means operably associated with said eighth pipe to permit partial recycling of heating medium flowing through said heat emitting system.

8. The heat storage system, as in claim 1, having a gas container interposed in said first pipe, for containing a gas encased above the surface of a predetermined minimum volume of heating medium.

* * * * *